THIN-FILM MAGNETIC STRUCTURES AND APPLICATION TO MAGNETIC MEMORIES

Filed Oct. 14, 1964

INVENTORS
LOUIS NÉEL, JEAN-CLAUDE BRUYERE,
OLIVIER MASSENET & ROBERT MONTMORY
BY
Abraham A. Saffitz
ATTORNEY

United States Patent Office 3,484,757
Patented Dec. 16, 1969

3,484,757

THIN-FILM MAGNETIC STRUCTURES AND APPLICATION TO MAGNETIC MEMORIES

Louis Néel and Jean-Claude Bruyère, Grenoble, Olivier Massenet, Meylan, and Robert Montmory, Grenoble, France, assignors to Centre National de la Recherche Scientifique, Paris, France, a French body corporate Filed Oct. 14, 1964, Ser. No. 403,792
Claims priority, application France, Oct. 18, 1963, 951,108
Int. Cl. G11b *5/74*
U.S. Cl. 340—174 3 Claims

ABSTRACT OF THE DISCLOSURE

In a memory storage device, a base film of low coercive field ferromagnetic metal, a non-ferromagnetic metal film having a thickness less than 500 angstroms over said base, and a top film of higher coercive field ferromagnetic metal, the higher field film having a uniaxial anisotropy identical to the lower field film and the hysteresis loop of the low field film being offset in the opposite direction to the residual magnetism of the higher field film, while the coupling field acts on the lower field film in the same direction as the residual magnetism of the higher field film, this coupling field being in the order of about 10 oersteds to permit the storage device to provide non-destructive read-out by applying interrogation pulses of limited intensity with strong output signals whose polarity depends upon the direction of magnetization of the higher field.

Figure 1:
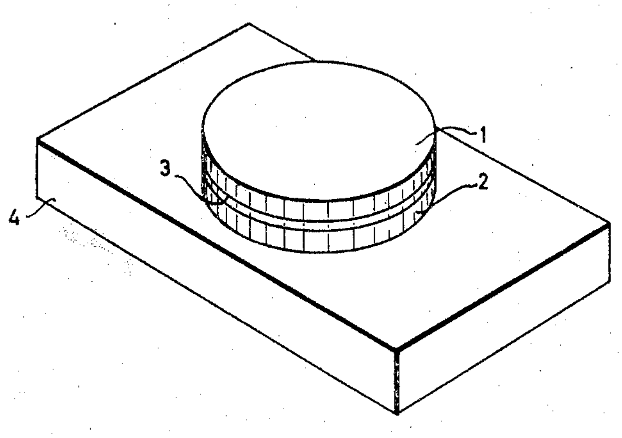
Figure 2A:
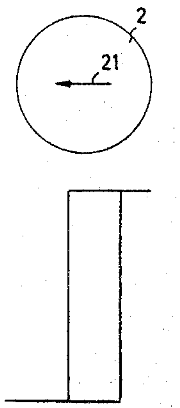
Figure 2B:
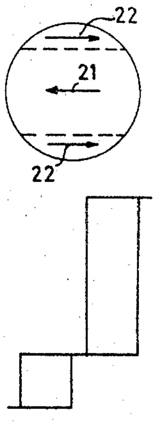
Figure 2C:
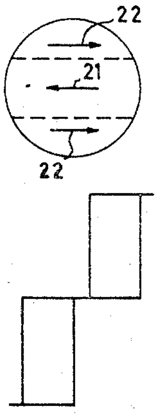
Figure 2D:
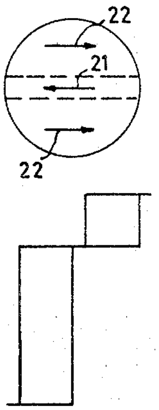
Figure 2E:
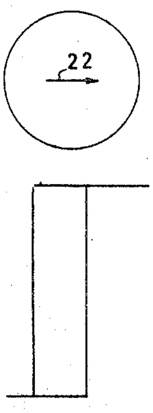

This invention relates to a new method of coupling between thin ferromagnetic films and more particularly thin films of a complex structure with hysteresis loops of special shapes and, by way of example the use of such films in magnetic memories.

It is known how to make thin films of ferromagnetic materials with rectangular hysteresis loops in a privileged direction known as the easy axis, and structures are known which comprise two ferromagnetic films with privileged magnetization directions coupled by the external magnetic field or the demagnetization field due to their residual magnetization, such films being separated from one another by either an insulating or conducting screen of non-magnetic material.

The production of such structures is subject to restrictive conditions and their use is limited by the nature of the coupling between the ferromagnetic films.

The general object of this invention is to extend the conditions under which structures comprising thin ferromagnetic films can be made and their applications.

Applicants have found that when the thickness of a thin film of a suitable non-ferromagnetic metal separating two ferromagnetic elements is less than a given value, approximately between 400 and 500 A., magnetic interactions of a new type occur between the two ferromagnetic elements and are such that the magnetization of one of the elements promotes the magnetization of the other element in the same direction. The strength of these interactions may be expressed by a quantity similar to a magnetic field, hereinafter referred to as the internal coupling field, and it depends firstly on the nature of the materials making up the ferromagnetic elements, and their thickness, and secondly on the nature and thickness of the non-ferromagnetic separating film, so that its value can readily be controlled.

These interactions are fundamentally different from those which are produced by the de-magnetization field due to residual magnetization. The direction of this internal coupling field is, in fact, the opposite to the direction of the de-magnetization field and of an order of magnitude which may be much greater.

A general characteristic of the structures according to the invention is the production—between thin ferromagnetic films separated by a very thin non-magnetic film—of the novel magnetic interactions as defined hereinabove under the name of the internal coupling field.

Another characteristic of the structures according to the invention is that they are formed by a stack of alternate thin films of ferromagnetic metals and non-ferromagnetic metals of a suitable nature and thickness to form thin films having hysteresis cycles of special shapes.

According to one embodiment of the invention, a thin film of complex structure comprises a first ferromagnetic film of low coercive field, an intermediate film of non-ferromagnetic metal of a thickness less than 500 A. and a second ferromagnetic film whose coercive field may be greater than that of the first film, said three films being deposited, for example, in the reverse sequence to that indicated above, on an insulating plate, by vacuum vapour coating during a single pumping cycle in the presence of a magnetic field which induces an identical uniaxial anisotropy direction for both ferromagnetic films.

The first film may be an iron and nickel alloy of the permalloy type having a coercive field of about 1.5 oersted, the second ferromagnetic film being, for example, a ternary compound of iron, nickel and cobalt, with a coercive field greater than that of the first film, and the said intermediate film may be formed from chromium. In the case of the above materials, an internal coupling field can be obtained in excess of 10 oersted. Other ferromagnetic alloys are also suitable for the ferromagnetic films and the intermediate film may be formed by another metal, more particularly palladium, platinum, manganese, silver, indium or aluminium.

The said ferromagnetic and intermediate films may also be produced by electrolytic deposition, chemical decomposition or other known methods.

Another characteristic of the complex structures according to the invention is that they can be used as memory elements having improved performances as compared with memory elements of the ferromagnetic type employing known thin films and as permanent memory elements.

The bistable character of the permanent magnetization of ferromagnetic elements in the form of a thin film having an easy axis is of course used to record information in very fast magnetic memories. A conventional method of reading out the information recorded in such a magnetic memory element comprises applying to such element a magnetic field pulse, known as the interrogation pulse, in a direction such as to cause the magnetization to switch over by coherent rotation, thus producing an induced flux which is detected but which destroys the information. To re-record the information the interrogation pulse must be followed by a second magnetic field or re-recording pulse which is applied along the easy axis of the ferromagnetic element. To avoid the loss of time resulting from such a re-recording cycle and which limits the speed of calculation of electronic computers using such memories, a known process comprises limiting the magnetic field of the interrogation pulse to a value such that the magnetization of the interrogated element turns through an angle of less than 90° and therefore resumes its initial orientation after interrogation. This process has the disadvantage of reducing the output or read-out signal in a ratio of 4 or 5 to the signal obtained by destructive read-out and also the disadvantage of slow destruction of information when the read-out or write-in operations recur at high frequency, the field required to produce a non-destructive coherent rotation decreasing when the frequency of the pulses applied to the memory element increases. To obviate this latter disadvantage, which is due to the open magnetic structure of such a memory element, it is also known to make memory elements with a thickness of not more than 400–500 A. and which therefore provide extremely low output signals, or also closed magnetic-structure elements formed by a group of two ferromagnetic films magnetized in anti-parallel relationship, between which the drive conductors pass. The space between these two layers then becomes very small and it is necessary to use very thin conductors which therefore have a high resistance and this is a major drawback to the production of the electronic drive circuits.

Another known process to obviate the information re-recording cycle comprises using two ferromagnetic films with different coercive fields, the film with the higher coercive field serving as the actual memory element and its residual magnetization governing the direction of the magnetization of the low coercive field film used as the read-out element, so that the information is automatically re-recorded in the read-out element after interrogation. The coupling field between such adjacent ferromagnetic films of different coercive fields is very high. By example several hundreds oersted, and heavy interrogation pulses are therefore necessary for switching over the magnetization of the low coercive field film. Also this switching cannot be limited to the film of low coercive field if both films together are not thick enough to allow a wall separating regions of different magnetization directions to be created in their thickness. This increased thickness of at least one of the ferromagnetic films allows eddy currents to appear resulting in a reduction of the operational speed. Also, the external interrogation pulse fields of the readout element affect the magnetic condition of the memory element and may tend towards progressive destruction of the information recorded in the memory element and undesirable rotation of the magnetization of the memory element so that interference signals occur on the read-out lines. To obviate these disadvantages it has been proposed to interpose a conductive screen of non-magnetic material between the memory element and the read-out element. Since the effect of such a screen is mainly to delay the transmission of the magnetic field variations between its two faces it is particularly effective against the above-mentioned interference signals but on the other hand it introduces a delay into the re-recording of information.

To summarize, the known memory elements employing thin ferromagnetic films are unsuitable for elimination of the re-recording cycle.

The complex structures according to the invention enable memory elements to be produced which have an automatic re-recording feature and improved performances, more particularly a high-level readout signal at the highest frequencies of use and very fast permanent memories of the ferromagnetic type.

Figure 3:
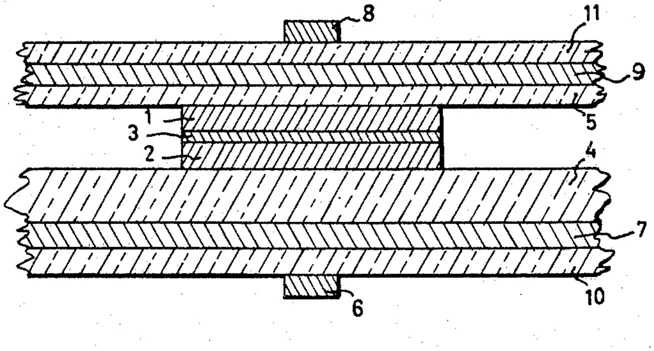

One example of embodiment of a complex structure according to the invention is described hereinbelow by way of illustration and without any limiting force with reference to the accompanying drawing wherein:

FIG. 1 shows a structure according to the invention;

FIGS. 2(*a*), 2(*b*), 2AC), 2(*d*) and 2(*e*) show hysteresis cycles obtained with the structure according to FIG. 1, and FIG. 3 is an axial section of a structure according to FIG. 1 arranged to as a memory element.

FIG. 1 shows the simplest embodiment of a structure according to the invention comprising: a thin ferromagnetic film 1 of about 1,000 A. thickness and formed by an alloy of the permalloy type, i.e., containing 80 to 82% by weight of nickel and 20 to 18% of iron, the coercive field of such an alloy being about 1.5 oersted and its magnetostriction coefficient being zero, a thin ferromagnetic film 2 whose thickness is of the same order of magnitude as the film 1 and which is formed by an alloy having a higher coercive field than the film 1 and which may be a ternary compound of iron, nickel and cobalt in the proportions required to give the required coercive field while having a zero coefficient of magnetostriction, for example in the proportion of 13% of iron, 52% of nickel and 35% of cobalt for a coercive field of 10 oersted; a film 3 of a suitable non-magnetic metal, for example palladium, of a thickness less than 500 A., separating the ferromagnetic films 1 and 2.

These three metal films are superimposed on an insulating film 4 which acts as a support and on which they may be made by vacuum evaporation of the alloy making up the film 2, palladium and the alloy making up the film 1 successively during a single pumping cycle in the presence of the magnetic field inducing an identical uniaxial anisotropic direction for the two ferromagnetic films 1 and 2. The thicknesses of the metal films 1, 2, 3 and of their insulating support 4 have been greatly exaggerated as compared with their other dimensions in order to simplify the drawing.

FIGS. 2(*a*), 2(*b*), 2(*c*), 2(*d*) and 2(*e*) show the shape of the hysteresis loop of the low coercive field film 1 for various states of magnetization of the film 2 indicated diagrammatically.

In FIG. 2(*a*), the film 2 is magnetized in the direction of the arrow 21, i.e., to the left, the film 2 is subject to the influence of a coupling field in the same direction, so that the hysteresis cycle plotted as an alternating current is offset to the right. In FIG. 2(*e*), the magnetization of the layer 2 is in the opposite direction as shown by the arrow 22 and the hysteresis loop of the film 1 is shifted to the left.

The shifting of the hysteresis loop of the low coercive field film 1 in the opposite direction to the magnetization of the higher coercive field film 2 is characteristic of the new type of internal coupling field between the two ferromagnetic films through a very thin film of a suitable non-magnetic metal.

When the magnetization is reversed by wall displacement, this shift occurs as shown diagrammatically in FIGS. 2(*b*), 2(*c*) and 2(*d*). In FIG. 2(*c*), the film 2 is perfectly de-magnetized, the antiparallel magnetizations of some domains in the direction of the arrows 21 balancing those of the other domains which are in the direction of the arrows 22. The hysteresis loop of the film 1 is then divided into two equal parts one of which is shifted to the left and the other to the right. In FIGS. 2(*b*) and 2(*d*), film 2 is only partially de-magnetized and the magnetizations of the domains respectively magnetized as shown by the arrows 21 and 22 are not balanced. The corresponding hysteresis loops of the film 1 are then divided into two unequal parts respectively shifted to the left and right the larger one being offset in the opposite direction to the residual magnetization of the film 2.

FIG. 3 is an axial section of the complex structure of FIG. 1 arranged to act as a fast non-destructive read-out memory element.

The ferromagnetic element 2 whose coercive field may be higher than that of the element 1 forms the actual memory element of the complex structure. Conductors 6 and 7 enabling information to be recorded in known manner are disposed at the back of the insulating film 4 which suports it and may be of suitable dimensions to carry a large number of similar elements. The said conductors are, for example, printed on the opposite surfaces of a thin insulating sheet 10.

The low coercive field ferromagnetic element 1 forms the readout element of the structure. Its surface remote from the thin non magnetic metal film 3 which separates it from the film 2 is covered by a very thin insulating film 5 which can also cover other similar elements and on which are disposed interrogation and read-out conductors 8 and 9 respectively which are, for example, printed on the opposite surfaces of an insulating sheet 11. The interrogation conductor 8 being disposed in parallel relationship to the easy axes of the ferromagnetic elements 1 and 2, a current pulse supplied to such conductor creates a field perpendicular to the direction of the easy axis so that the magnetization of the read-out element 1 is turned by coherent rotation. Such rotation induces a read-out signal in the conductor 9 perpendicular to the easy axis, the polarity of such signal depending upon the direction of magnetization of the element 2.

What we claim is:

1. A thin film memory storage device adapted to be mounted to an insulated base comprising a low coercivity field ferromagnetic metal film on which is superimposed a non-ferromagnetic metal film having a thickness of less than 500 angstroms, the non-ferromagnetic metal being selected from the group consisting of silver, indium, chromium, manganese, palladium and platinum, and a top layer of a higher coercivity field ferromagnetic film, each of said low and higher coercivity field ferromagnetic films having a square hysteresis loop and the same uniaxial anisotropy axis, the hysteresis loop of said low coercivity field ferromagnetic film which is plotted in the anisotropy direction being offset in the opposite direction to the residual magnetism of said higher coercivity field ferromagnetic film, the coupling field which passes through said non-ferromagnetic metal film which acts on said low coercivity field film being in the same direction as the residual magnetism of said higher coercivity field film to provide non-destructive read-out of the memory storage device by applying interrogation pulses of limited intensity, said read-out producing strong output signals whose polarity depends upon the direction of magnetization of said higher coercivity field film.

2. A fast permanent ferromagnetic memory adapted to be mounted on an insulated base consisting of a plurality of thin film memory storage devices, each of said memory devices comprising a low coercivity field ferromagnetic metal film on which is superimposed a non-ferromagnetic metal film having a thickness of less than 500 angstroms, the non-ferromagnetic metal being selected from the group consisting of silver, indium, chromium, manganese, palladium and platinum, and a top layer of a higher coercivity field ferromagnetic film, each of said low and higher coercivity field ferromagnetic films having a square hysteresis loop and the same uniaxial anisotropy axis, the hysteresis loop of said low coercivity field ferromagnetic film which is plotted in the anisotropy direction being offset in the opposite direction to the residual magnetism of said higher coercivity field ferromagnetic film, the coupling field which passes through said non-ferromagnetic metal film which acts on said low coercivity field film being in the same direction as the residual magnetism of said higher coercivity field film to provide non-destructive read-out of the memory storage device by applying interrogation pulses of limited intensity, said read-out producing strong output signals whose polarity depends upon the direction of magnetization of said higher coercivity field film.

3. A thin film memory storage device as claimed in claim 1 wherein said low coercivity field ferromagnetic film has a coercivity of about 1.5 oersteds and the coercivity of said higher coercivity field ferromagnetic film is about 10 oersteds.

References Cited

UNITED STATES PATENTS 3,125,743 3/1964 Pohm et al. -------- 340—174

JAMES W. MOFFITT, Primary Examiner